United States Patent [19]

Dehaene

[11] 4,365,205
[45] Dec. 21, 1982

[54] DEMODULATOR FOR SIGNAL WHICH IS FREQUENCY MODULATED BY DIGITAL DATA

[75] Inventor: Jean P. Dehaene, Paris, France
[73] Assignee: Thomson-CSF, Paris, France
[21] Appl. No.: 214,661
[22] Filed: Dec. 9, 1980

[30] Foreign Application Priority Data

Dec. 27, 1979 [FR] France .............................. 79 31804

[51] Int. Cl.³ .............................................. H03D 3/00
[52] U.S. Cl. .................................. 329/122; 329/110;
375/81; 375/120; 455/208; 455/260
[58] Field of Search ............................ 329/50, 110, 122;
375/80, 81, 120; 455/208, 214, 260, 337

[56] References Cited

U.S. PATENT DOCUMENTS 3,525,945  8/1970  Puente ............................ 329/122 X
4,308,503  12/1981  Scott ............................. 329/122 X

FOREIGN PATENT DOCUMENTS 563899  12/1923  France .
1259477  3/1961  France .
2302640  9/1976  France .
244477  4/1947  Switzerland .
1022598  3/1966  United Kingdom .

OTHER PUBLICATIONS

Mano, "Study of a Carrier-Regenerating Circuit for VSB Demodulation", Electronics and Communications in Japan, vol. 58A, Nov. 1975, pp. 18-24.

Primary Examiner—Siegfried H. Grimm
Attorney, Agent, or Firm—Cushman, Darby & Cushman

[57] ABSTRACT

In a device comprising a linear frequency demodulator, the demodulation threshold is improved for demodulation of signals which have been modulated by a digital data item and have an energy line at the carrier frequency. To this end, the received modulated signal is not applied directly to the demodulator but added within an adder circuit to a signal corresponding to the carrier-frequency line which is obtained by means of a carrier recovery circuit. The output signal of the adder circuit is applied to the input of the linear frequency demodulator.

2 Claims, 6 Drawing Figures

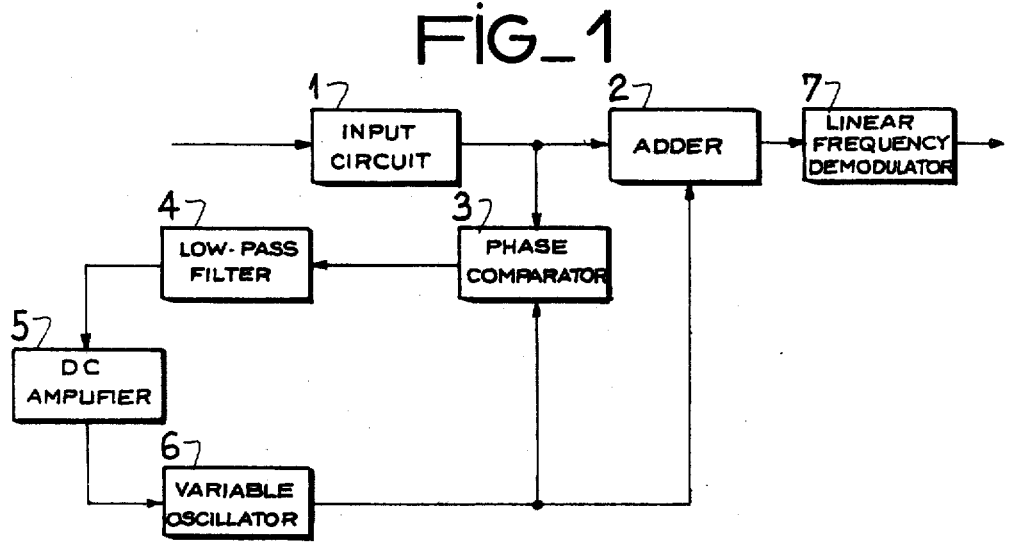
FIG_1
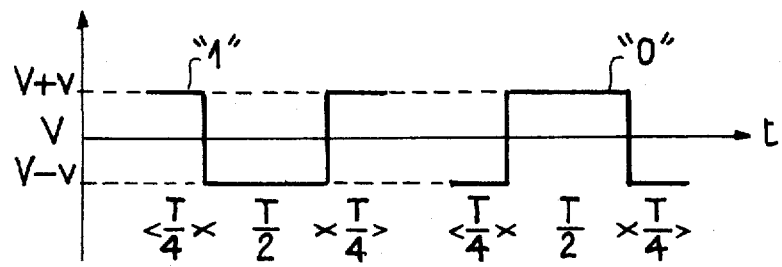
FIG_2
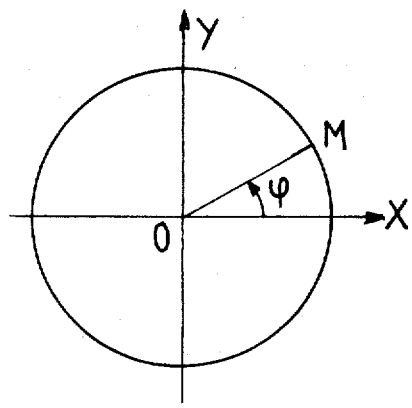
FIG_3
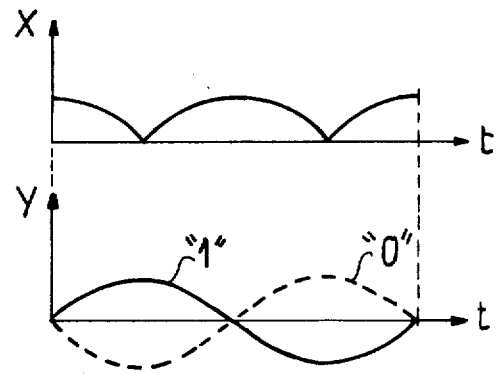
FIG_4

FIG_5
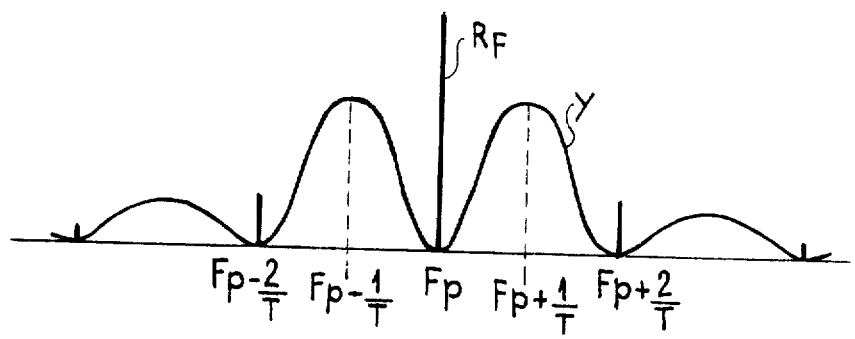
FIG_6
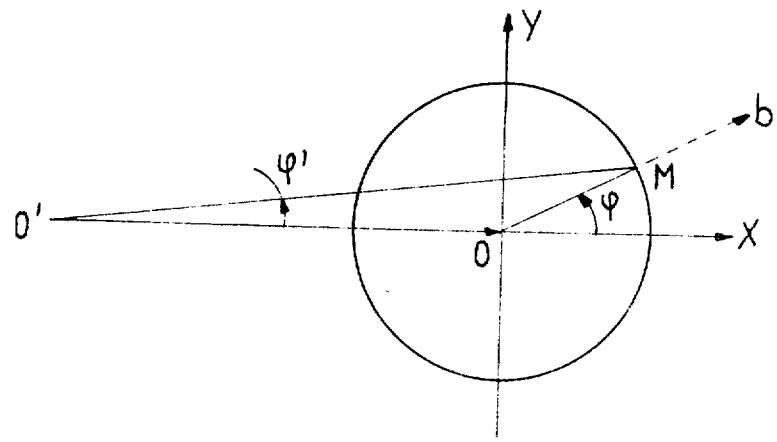

DEMODULATOR FOR SIGNAL WHICH IS FREQUENCY MODULATED BY DIGITAL DATA

This invention relates to a device for demodulation of a modulated signal resulting from frequency modulation of a carrier by a digital data item and having a spectral line at the carrier frequency.

In known devices of this type, provision is made for a phase-locked loop which delivers the modulating information. A loop of this type consists of a phase comparator which receives the information to be demodulated on one of its inputs and the output of which is connected through a low-pass filter and an amplifier to the control input of a variable oscillator circuit. The output of the oscillator is connected to the other input of the phase comparator and the demodulated signal is collected at the output of the amplifier. Phase-locked loops must be of the wide band type since they must be designed to pass the entire band of frequencies of the modulating information. The construction of these loops is therefore both difficult and costly.

The aim of the present invention is to overcome these drawbacks by converting the signal to be demodulated in such a manner as to permit demodulation by means of a linear frequency demodulator of the same type as the discriminator-demodulators which are commonly employed in analog radio-link systems. Thus the circuit in accordance with the invention permits the use of conventional analog radio-link equipment for temporarily receiving digital data.

According to the invention there is provided a device for demodulating a modulated signal resulting from frequency modulation of a carrier by a digital data item and having a spectral line at the carrier frequency. Said device comprises:
an adder circuit having a first input for receiving the modulated signal, a second input and an output,
carrier recovery means for receiving the modulated signal and having one output coupled to the second input of the adder circuit;
and a linear frequency demodulator having one input coupled to the output of the adder circuit.

These and other features of the invention will be more apparent upon consideration of the following description and accompanying drawings, wherein:

FIG. 1 shows a device in accordance with the invention;

FIGS. 2 to 6 are graphs relating to the signals of the device shown in FIG. 1.

FIG. 1 shows an input circuit 1 which receives high-frequency information-carrying signals. Said input circuit comprises a frequency-translation device and delivers intermediate-frequency signals.

In the example of construction shown in FIG. 1, the received signals result from frequency modulation of a carrier at the frequency F by binary signals representing the information to be transmitted. As shown in FIG. 2, said binary signals are square-wave signals having a time-duration $T=1/f$; the logical value of "1" is represented by a signal having an amplitude of $V+v$ during the first and last quarters of its time-duration and an amplitude $V-v$ during the second and third quarters of its time-duration; the logical value "0" is represented by a signal having an amplitude $V-v$ during the first and last quarters of its time-duration and having an amplitude $V+v$ during the second and third quarters of its time-duration.

As a result of frequency modulation, said signals having an amplitude $V+v$ and $V-v$ are converted respectively to signals at the frequency $F+dF$ and $F-dF$. The value dF is chosen so as to be equal to f so that, during the time intervals $dT=T/4$ in which the binary elements "1" and "0" of FIG. 2 have a constant amplitude, the phase shift (the corresponding frequency swing is equivalent to said phase shift) results in a phase difference of $\pi/2$ with respect to the unmodulated signal or in other words with respect to the carrier at the frequency F.

FIG. 3 is a trigonometric representation of the phase shift $\phi$ of the modulated carrier represented by a vector OM, the extremity M of which passes at constant velocity from $-\pi/2$ to $+\pi/2$ and describes a trigonometric circle having axes OX and OY.

FIG. 4 can readily be deduced from FIG. 3 and is a representation of the variation of the abscissa OX and of the ordinate OY of the point M which is representative of the phase of the modulated signal. The variation of abscissae is the same, whether the modulating binary element is either a "1" or a "0", whereas the variation of ordinates is different: curve having the reference "1" relating to the binary element "1" and curve having the reference "0" relating to the binary element "0".

FIG. 5 shows the spectrum of the modulated signal. This spectrum is composed of lines relating to the component OX located at the frequencies $F\pm nf$ (with $n=0, 2, 4\ldots$) and of the lines relating to the component OY, the envelope of which is designated in FIG. 4 by the letter Y. The amplitude of said envelope falls to zero in respect of $F\pm nf$, that is to say in respect of the spectral lines relating to the componenet OX.

It is therefore possible to recover the line $R_F$ at the frequency F. After amplification, the signal thus obtained can be added to the received signal in phase with the carrier of said received signal. FIG. 6 shows this addition in a trigonometric representation and also shows the noise vector which is representative of the noise accompanying the received signal.

The amplified spectral line $R_F$ (vector O'O in FIG. 6) added to the intermediate-frequency signal (vector OM in FIG. 6) or, in other words, to the received modulated carrier, produces a new signal (vector O'M in FIG. 6) in which the phase modulation $\phi'$ is compressed with respect to the phase modulation $\phi$ of the received modulated carrier.

In FIG. 6, the noise accompanying the useful signal (vector OM) is represented by a vector Mb; this vector of random amplitude and direction provides a fairly accurate representation of the physical reality of the noise. Noteworthy is the fact that the probability that the path of the extremity b of the noise vector surrounds the origin O' of the new signal in the course of time is much smaller than the probability that it surrounds the origin O of the received modulated carrier. The threshold of a discriminator can thus be improved, not by delivering the received modulated carrier directly to said discriminator but by delivering this signal after re-injection of a signal at the carrier frequency. This procedure is carried out in the device shown in FIG. 1 in which the received modulated carrier is delivered by the input circuit 1 as already noted earlier. This signal is applied on the one hand to the first input of an adder 2 and on the other hand to a carrier recovery circuit composed of the following elements:
a phase comparator 3 which receives on its first input the modulated carrier delivered by the input circuit 1, a low-pass filter 4 connected to the output of the phase comparator 3 in order to remove the alternating-current component from the output signal of the comparator, a variable-gain direct-current amplifier 5 for amplifying the output signal of the filter 4, and a variable oscillator 6, the control input of which receives the output signal of the amplifier 5 and the output of which is connected to the second input of the phase comparator 3 and to the second input of the adder 2.

The output signal of the adder corresponds to the signal with reinjected carrier already mentioned in the description relating to FIG. 6. This signal is applied to the input of a linear frequency demodulator 7 of the discriminator-demodulator type, the discrimination threshold of which is thus artificially improved in respect of the modulated signal delivered by the input circuit 1.

It should be noted that this method of improving the discrimination threshold is applicable only in the case of digital transmission since the phase compression thus achieved does not modify the phase in a linear manner. Calculation shows, and experience has confirmed, that it is nevertheless possible to make provision behind the demodulator 7 only for the filtering circuits which would have been employed without the carrier reinjection device.

The invention is not limited to the case of the example hereinabove described. From this it accordingly follows that the carrier recovery circuit shown in FIG. 1 (elements 3 to 6) can be replaced by a bandpass filter centered on the carrier frequency of the received modulated signal.

In very broad terms, the device in accordance with the invention can be employed for demodulation of any signal which has been modulated by a digital data item and the spectrum of which has a line at the carrier frequency.

The device in accordance with the invention is more particularly intended to equip a radio receiver of an analog radio-link system when this latter is employed for temporary transmission of digital data; in this case a simple switching circuit serves to couple the output of the input circuit 1 of FIG. 1 to the input of the demodulator 7, either as shown in FIG. 1 or by means of a simple connection.

What is claimed is:

1. A device for demodulating a modulated signal resulting from frequency modulation of a carrier by a digital data item and having a spectral line at the carrier frequency, wherein said device comprises:
   an adder circuit having a first input for receiving the modulated signal, a second input and an output,
   carrier recovery means for receiving the modulated signal and having one output coupled to the second input of the adder circuit;
   and a linear frequency demodulator having one input coupled to the output of the adder circuit.

2. A device for demodulating a signal according to claim 1, wherein the carrier recovery means have one output and comprise in series a phase comparison circuit having a first input for receiving the modulated signal and a second input, a low-pass filter, an amplifier, a variable oscillator controlled by the amplifier and having one output coupled to the second input of the phase comparison circuit and to the output of the carrier recovery means.

* * * * *